Patented Aug. 9, 1927.

1,638,535

UNITED STATES PATENT OFFICE.

ARCHIE R. KEMP, OF EAST ORANGE, NEW JERSEY, ASSIGNOR TO WESTERN ELECTRIC COMPANY, INCORPORATED, OF NEW YORK, N. Y., A CORPORATION OF NEW YORK.

PLASTIC MATERIAL.

No Drawing. Application filed July 12, 1924. Serial No. 725,691.

This invention relates to plastic materials, and its object is to produce a thermoplastic material which is particularly suitable for the insulation of electrical conductors.

It is a common practice to insulate electrical conductors by means of a rubber compound, which, when vulcanized provides a soft elastic covering which is also a good insulator. This compound, as a rule, contains from 2½ to 5% sulphur by weight and is vulcanized at a temperature corresponding to from 30 to 60 pounds steam pressure. Such an insulated conductor, while satisfactory for many uses, has not proven satisfactory for long submarine cables, since the soft rubber absorbs water and the resulting osmotic swelling may cause deleterious changes in the electrical constants of the cable. For this reason, gutta percha is almost universally used for insulating submarine cable conductors; but, because of its high cost and limited source of supply, various substitutes have been proposed from time to time. The use of hard rubber or semi-hard rubber as the insulating material for submarine cables offers important advantages because of its low conductance, low dielectric constant and its limited absorption of water, and in a copending application of Robert R. Williams, Serial No. 703,660, filed April 2, 1924, there is disclosed a method of applying such an insulation to a conductor without the disadvantages resulting when such a material is vulcanized on the conductor itself. What is commercially known as hard rubber contains from 20 to 30% sulphur, while the material designated as semi-hard rubber contains from 16 to 20% sulphur. These materials, however, are thermoplastic only to a limited degree, and their application to an electrical conductor necessitates special precautions.

In accordance with a feature of the present invention, rubber and sulphur are compounded in the proper proportions and given a heat treatment whereby the resulting material possesses characteristics similar to gutta percha as regards its thermoplastic property and can be extruded and similarly manipulated without special precautions. This material may be used alone as an insulating material to take the place of gutta percha, or may be combined with a compounding material such for example as a wax or gum to modify its mechanical characteristics to suit some particular condition.

In the preferred process, the raw rubber is compounded with 12% of sulphur by weight, these materials being thoroughly mixed together by working on the rolls of a standard rubber mill. After being thoroughly mixed, the compound is then vulcanized or heat treated by maintaining it at a temperature of approximately 225° C. for a period of approximately one hour. For general purposes, the best result is obtained if the above percentage of sulphur is employed, but this proportion may be changed somewhat to meet particular conditions, and the resulting material will have the same general characteristics. Thus, when using 8% sulphur, the resulting material resembles smoked sheet rubber, the hardness and toughness being little changed by reducing the temperature to 0° C. and when 16% sulphur is used, the resulting product becomes brittle at this temperature. The temperature for the heat treatment preferably is maintained at approximately 225° C., but for commercial use should not be less than 200° C. and it should not exceed 280° C. The minimum time required for this treatment depends upon the temperature maintained but a period of approximately one hour is sufficient in the case of a temperature of 225° C.

The insulating material obtained by following this process is very similar to gutta percha in its physical properties and can be extruded and worked in much the same manner. In its electrical characteristics, it is as good or better than gutta percha, and it can be obtained at a considerable saving in cost. For certain uses it may be found desirable to mix this material with a compounding material such at balata, paraffine, bitumen, etc. A material especially suitable for the insulation of submarine conductors is obtained by mixing this material with approximately 25% its weight of balata.

It is believed that the high degree of thermoplasticity of this material is largely due to disaggregation of the highly aggregated polyprene or rubber sulphide molecules through the agency of suitable heat, which theory is borne out by the fact that similar results are obtained even though there is a halt in the vulcanization of heating process. Thus, a compound containing the right proportions of rubber and sulphur may be vulcanized at ordinary vulcanizing temperatures corresponding to 50 to 60 pounds steam pressure, and then may later be subjected to a temperature of 200 to 280° C., and the resulting product will have the same mechanical characteristics as it would have had if the heating treatment had been completed in one step. Instead of employing a high temperature for disaggregating the rubber sulphide molecules, it is possible that similar results might be obtained by the use of a suitable catalytic agent.

Because of the fact that the heat treatment does not have to be performed continuously, it is possible to obtain a material having satisfactory thermoplastic properties by mixing reclaiming rubber stock with the proper amount of sulphur, and then heating to a temperature of approximately 225° C. and maintaining the material at this temperature for a period of approximately one hour.

Although the material made in accordance with this process is especially suitable for use in insulating electrical conductors, its physical properties are such that it may be used in different fields as a substitute for gutta percha and one that can be obtained at a much lower cost.

The term "thermoplastic", as used in this specification and the appended claims, should be taken to denote the property, possessed by a material, of varying its plasticity in accordance with variations in its temperature. By qualifying the term "thermoplastic" in this specification and the appended claims by comparing such property with the thermoplastic properties of gutta percha it is intended that the term, as qualified, should approximately represent such variations in plasticity as are manifested by gutta percha within the temperatures, which on one hand exist at the sea bottom or other places where conductors insulated with gutta percha are ordinarily placed for operation and may be below zero degrees centigrade, and which on the other hand are ordinarily maintained during the extruding process in the manufacture of gutta percha insulated cables and do not exceed 100° C.

What is claimed is:

1. A material having the thermoplastic properties of gutta percha comprising rubber mixed with 8 to 16% sulphur and subjected to a temperature sufficiently high to render the material thus thermoplastic.

2. A material having the thermoplastic properties of gutta percha comprising rubber mixed with 8 to 16% sulphur, and subjected to a temperature of not less than 200° C. and not more than 280° C.

3. A material having the thermoplastic properties of gutta percha comprising rubber mixed with 8 to 16% sulphur, and subjected to a temperature of approximately 225° C. for a period of approximately one hour.

4. A material having the thermoplastic properties of gutta percha comprising rubber mixed with 12% sulphur by weight, and subjected to a temperature of approximately 225° C. for a period of approximately one hour.

5. A material comprising rubber mixed with 8 to 16% sulphur and heat treated, so that it is nonplastic at a temperature of 10° C. and can be extruded at a temperature of 80°C.

6. A material having the thermoplastic properties of gutta percha comprising rubber mixed with 8 to 16% sulphur and heat treated at a temperature of approximately 225° C., to which is added an insulating material.

7. A thermoplastic material comprising a rubber-sulphur compound heat treated at a temperature of approximately 225° C., to which is added balata.

8. The process of producing a material having the thermoplastic properties of gutta percha which comprises compounding a mixture of rubber and 8 to 16% sulphur and subjecting this mixture to a temperature sufficiently high to render the material thus thermoplastic.

9. A material comprising principally rubber mixed with 12% sulphur and heat treated to have at around 80° C. the thermoplastic properties of gutta percha which enable it to be extruded, and to have at around 0° C. to 20° C. the properties of gutta percha which enable it to serve effectively as an insulator for submarine cables.

10. The process of producing a material which is non-plastic at a temperature of 10° C. and can be extruded at a temperature of 80° C. which comprises compounding rubber with from 8% to 16% of sulphur and heating to a temperature of from 200° to 280° C.

11. The process of producing a material having the thermoplastic properties of gutta percha, which comprises compounding rubber with 12% sulphur and subjecting the compound to a temperature of 225° C. for a period of approximately one hour.

12. The process of producing a material having the thermoplastic properties of gutta percha, which comprises compounding rubber with from 8 to 16% sulphur and subjecting such compound to a heat treatment sufficient to vulcanize the material, and then subjecting the material to a temperature of 200 to 280° C. to disaggregate the highly aggregated rubber sulphide molecules.

13. The process of producing a material having the thermoplastic properties of gutta percha, which consists in compounding rubber with 12% sulphur, maintaining the compound at a temperature of approximately 225° C. for a period of approximately one hour, and mixing the resulting compound with approximately 25% balata.

14. The process of producing a material having the thermoplastic properties of gutta percha, which consists in mixing with reclaiming rubber stock a sufficient amount of sulphur to bring the total sulphur content up to from 8 to 16%, and heating said mixture for a period of approximately one hour at a temperature of from 200 to 280° C.

In witness whereof, I hereunto subscribe my name this 9th day of July, A. D. 1924

ARCHIE R. KEMP.